(12) United States Patent
Numata et al.

(10) Patent No.: US 12,085,195 B2
(45) Date of Patent: Sep. 10, 2024

(54) FLEXIBLE TUBE

(71) Applicant: TOYOX CO., LTD., Toyama (JP)

(72) Inventors: Kenichi Numata, Toyama (JP); Masaru Okura, Toyama (JP)

(73) Assignee: TOYOX CO., LTD., Toyama (JP)

( * ) Notice: Subject to any disclaimer, the term of this patent is extended or adjusted under 35 U.S.C. 154(b) by 0 days.

(21) Appl. No.: 18/210,471

(22) Filed: Jun. 15, 2023

(65) Prior Publication Data

US 2024/0133491 A1  Apr. 25, 2024
US 2024/0229980 A9  Jul. 11, 2024

Related U.S. Application Data

(63) Continuation of application No. PCT/JP2022/039985, filed on Oct. 26, 2022.

(30) Foreign Application Priority Data

Oct. 25, 2022  (JP) .................. 2022-170286

(51) Int. Cl.
*F16L 11/08*  (2006.01)
*B32B 1/08*  (2006.01)
(Continued)

(52) U.S. Cl.
CPC ............ *F16L 11/08* (2013.01); *B32B 1/08* (2013.01); *B32B 7/12* (2013.01); *B32B 27/08* (2013.01);
(Continued)

(58) Field of Classification Search
CPC ... F16L 11/08; B32B 1/08; B32B 7/12; B32B 27/08; B32B 27/34; B32B 2250/02;
(Continued)

(56) References Cited

U.S. PATENT DOCUMENTS 10,801,649 B2  10/2020  Ludlow et al.

FOREIGN PATENT DOCUMENTS

JP   8-104805 A   4/1996
JP   2004-203012 A   7/2004
(Continued)

OTHER PUBLICATIONS

English machine translation for JP2007-196522 (2007) (Year: 2007).*
(Continued)

*Primary Examiner* — Michael C Miggins
(74) *Attorney, Agent, or Firm* — The Marbury Law Group PLLC

(57) ABSTRACT

A flexible tube includes at least a first resin layer which includes a fluororesin and has a thickness of 0.05 to 0.5 mm and 1 to 16% of the overall thickness of the flexible tube, and a second resin layer which is provided on an outer side of the first resin layer and includes a thermoplastic resin different from that in the first resin layer, wherein in the fluororesin, the flexural modulus measured by ASTM D790 is 500 to 1200 MPa, and the ratio (A)/(B), which is obtained by FTIR measurement, of the peak area (A) corresponding to C—H bonds at a wavenumber of 1400 to 1500 cm$^{-1}$ to the peak area (B) corresponding to C—F bonds at a wavenumber of 1000 to 1100 cm$^{-1}$ is 0.2 to 4.0.

4 Claims, 8 Drawing Sheets

FTIR measurement data and peak area of adhesive ETFE 5 (1000 to 1100 cm$^{-1}$)

| No. | FTIR measurement data | | Calculated value | |
|---|---|---|---|---|
| | Wavenumber (cm$^{-1}$) | Transmittance (%) | First differential value | Second differential value |
| 1 | 1000.3922 | 78.3904 | -0.334 | 0.200 |
| 2 | 1000.8743 | 78.2295 | -0.237 | 0.127 |
| 3 | 1001.3564 | 78.1152 | -0.176 | 0.006 |
| 71 | 1034.1404 | 55.3247 | -2.794 | -0.083 |
| 72 | 1034.6226 | 53.9773 | -2.834 | 0.118 |
| 73 | 1035.1046 | 52.6112 | -2.777 | 0.232 |
| 74 | 1035.5868 | 51.2719 | -2.666 | 0.251 |
| 75 | 1036.0688 | 49.9870 | -2.545 | 0.180 |
| 76 | 1036.551 | 48.7598 | -2.458 | 0.089 |
| 77 | 1037.0331 | 47.5746 | -2.415 | 0.034 |
| 78 | 1037.5153 | 46.4099 | -2.399 | 0.068 |
| 79 | 1037.9973 | 45.2536 | -2.366 | 0.170 |
| 80 | 1038.4795 | 44.1127 | -2.284 | 0.313 |
| 81 | 1038.9615 | 43.0118 | -2.133 | 0.427 |
| 82 | 1039.4437 | 41.9831 | -1.927 | 0.494 |
| 83 | 1039.9258 | 41.0539 | -1.689 | 0.511 |
| 84 | 1040.4080 | 40.2393 | -1.443 | 0.513 |
| 85 | 1040.8900 | 39.5438 | -1.196 | 0.510 |

Point at which positive and negative of second differential values are changed = Base [1]

Two points on either side of half value (transmittance 42.5873) = Half value [1]

FTIR measurement data and peak area of adhesive ETFE 5 (1000 to 1100 cm$^{-1}$)

| No. | FTIR measurement data | | Calculated value | |
|---|---|---|---|---|
| | Wavenumber (cm$^{-1}$) | Transmittance (%) | First differential value | Second differential value |
| 86 | 1041.3722 | 38.9673 | -0.950 | 0.502 |
| 87 | 1041.8542 | 38.5096 | -0.708 | 0.463 |
| 88 | 1042.3364 | 38.1684 | -0.494 | 0.389 |
| 89 | 1042.8185 | 37.9349 | -0.297 | 0.297 |
| 90 | 1043.3007 | 37.7917 | -0.154 | 0.229 |
| 91 | 1043.7827 | 37.7176 | -0.044 | 0.204 |
| 92 | 1044.2649 | 37.6966 | 0.055 | 0.214 |
| 93 | 1044.7469 | 37.7231 | 0.158 | 0.219 |
| 94 | 1045.2291 | 37.7994 | 0.264 | 0.186 |
| 95 | 1045.7112 | 37.9265 | 0.353 | 0.120 |
| 96 | 1046.1934 | 38.0968 | 0.411 | 0.060 |
| 97 | 1046.6754 | 38.2949 | 0.440 | 0.050 |
| 98 | 1047.1576 | 38.5070 | 0.464 | 0.096 |
| 99 | 1047.6396 | 38.7307 | 0.511 | 0.164 |
| 100 | 1048.1218 | 38.9769 | 0.590 | 0.205 |
| 101 | 1048.6039 | 39.2612 | 0.688 | 0.194 |
| 102 | 1049.0861 | 39.5931 | 0.782 | 0.144 |
| 103 | 1049.5681 | 39.9699 | 0.851 | 0.103 |
| 104 | 1050.0503 | 40.3804 | 0.901 | 0.095 |
| 105 | 1050.5323 | 40.8146 | 0.947 | 0.126 |
| 106 | 1051.0145 | 41.2711 | 1.008 | 0.153 |
| 107 | 1051.4966 | 41.7569 | 1.082 | 0.135 |
| 108 | 1051.9788 | 42.2784 | 1.146 | 0.048 |
| 109 | 1052.4609 | 42.8310 | 1.170 | -0.081 |
| 204 | 1098.2620 | 74.6823 | -0.370 | 0.048 |
| 205 | 1098.7440 | 74.5038 | -0.347 | 0.053 |
| 206 | 1099.2262 | 74.3363 | -0.322 | -0.030 |

Point at which positive and negative of first differential values are changed = Peak Two points on either side of half value (transmittance 42.5873) = Half value [2]

Point at which positive and negative of second differential values are changed = Base [2]

(51) Int. Cl.
  *B32B 7/12* (2006.01)
  *B32B 27/08* (2006.01)
  *B32B 27/34* (2006.01)

(52) U.S. Cl.
  CPC .......... *B32B 27/34* (2013.01); *B32B 2250/02* (2013.01); *B32B 2250/03* (2013.01); *B32B 2250/24* (2013.01); *B32B 2307/7376* (2023.05); *B32B 2597/00* (2013.01)

(58) Field of Classification Search
  CPC ............ B32B 2250/03; B32B 2250/24; B32B 2307/7376; B32B 2597/00
  See application file for complete search history.

(56) References Cited

FOREIGN PATENT DOCUMENTS

| | | |
|---|---|---|
| JP | 2004-216779 A | 8/2004 |
| JP | 2004-247103 A | 9/2004 |
| JP | 2005-102681 A | 4/2005 |
| JP | 4247103 B | 1/2009 |
| JP | 2010-133502 A1 | 6/2010 |
| JP | 4696293 B | 3/2011 |
| JP | 2012-514547 A | 6/2012 |
| JP | 2015-078758 A | 4/2015 |
| JP | 2020-535986 A | 12/2020 |
| JP | 2021-151762 A | 9/2021 |

OTHER PUBLICATIONS

English translation for CN105658429, Jun. 8, 2016. (Year: 2016).*
International Search Report received from the Japanese Patent Office in related Patent Application No. PCT/JP2022/039985 dated Jan. 17, 2023; 10 pages.
The Japan Patent Office, "Notice of Reasons for Revocation", issued in related Japanese Application No. 2023-701301, dated Apr. 17, 2024, Including English Translation (74 pages).
Catalog for "adhesive fluropolymer Neoflon™," EFEP, Daikin Industries, Ltd., May 2003 (8 pages).
Nakano, et al., "Reply about the statement on the bottom right of the back cover of Evidence A No. 2," Daikin Industries, Ltd., dated Nov. 2, 2023 (4 pages).
"Analysis Report", Foundation for Promotion of Material Science and Technology of Japan, resin pellet FT-IR Analysis , dated Oct. 20, 2023 (6 pages).
"Resin pellet FT-IR Analysis 3," Analysis and Evaluation Department of Foundation for Promotion of Material Science and Technology of Japan, Nov. 15, 2023 (6 pages).
Catalog for "Eco Loop <multilayer fluoropolymer hose>", Bridgestone Corporation, dated Feb. 2022 (8 pages).
Nakano, "reply about characteristics of Neoflon EFEP RP-5000", Daikin Industries, Ltd., dated Nov. 16, 2023 (1 page).

* cited by examiner

FTIR measurement data and peak area of adhesive ETFE 5 (1000 to 1100 cm⁻¹)

| No. | FTIR measurement data | | Calculated value | |
|---|---|---|---|---|
| | Wavenumber (cm⁻¹) | Transmittance (%) | First differential value | Second differential value |
| 1 | 1000.3922 | 78.3904 | -0.334 | 0.200 |
| 2 | 1000.8743 | 78.2295 | -0.237 | 0.127 |
| 3 | 1001.3564 | 78.1152 | -0.176 | 0.006 |
| 71 | 1034.1404 | 55.3247 | -2.794 | -0.083 |
| 72 | 1034.6226 | 53.9773 | -2.834 | 0.118 |
| 73 | 1035.1046 | 52.6112 | -2.777 | 0.232 |
| 74 | 1035.5868 | 51.2719 | -2.666 | 0.251 |
| 75 | 1036.0688 | 49.9870 | -2.545 | 0.180 |
| 76 | 1036.551 | 48.7598 | -2.458 | 0.089 |
| 77 | 1037.0331 | 47.5746 | -2.415 | 0.034 |
| 78 | 1037.5153 | 46.4099 | -2.399 | 0.068 |
| 79 | 1037.9973 | 45.2536 | -2.366 | 0.170 |
| 80 | 1038.4795 | 44.1127 | -2.284 | 0.313 |
| 81 | 1038.9615 | 43.0118 | -2.133 | 0.427 |
| 82 | 1039.4437 | 41.9831 | -1.927 | 0.494 |
| 83 | 1039.9258 | 41.0539 | -1.689 | 0.511 |
| 84 | 1040.4080 | 40.2393 | -1.443 | 0.513 |
| 85 | 1040.8900 | 39.5438 | -1.196 | 0.510 |

Point at which positive and negative of second differential values are changed = Base [1]

Two points on either side of half value (transmittance 42.5873) = Half value [1]

FIG.1A

FTIR measurement data and peak area of adhesive ETFE 5 (1000 to 1100 cm⁻¹)

| No. | FTIR measurement data | | Calculated value | |
|---|---|---|---|---|
| | Wavenumber (cm⁻¹) | Transmittance (%) | First differential value | Second differential value |
| 86 | 1041.3722 | 38.9673 | -0.950 | 0.502 |
| 87 | 1041.8542 | 38.5096 | -0.708 | 0.463 |
| 88 | 1042.3364 | 38.1684 | -0.484 | 0.389 |
| 89 | 1042.8185 | 37.9349 | -0.297 | 0.297 |
| 90 | 1043.3007 | 37.7917 | -0.154 | 0.229 |
| 91 | 1043.7827 | 37.7176 | -0.044 | 0.204 |
| 92 | 1044.2649 | 37.6966 | 0.055 | 0.214 |
| 93 | 1044.7469 | 37.7231 | 0.158 | 0.219 |
| 94 | 1045.2291 | 37.7994 | 0.264 | 0.186 |
| 95 | 1045.7112 | 37.9265 | 0.353 | 0.120 |
| 96 | 1046.1934 | 38.0968 | 0.411 | 0.060 |
| 97 | 1046.6754 | 38.2949 | 0.440 | 0.050 |
| 98 | 1047.1576 | 38.5070 | 0.464 | 0.096 |
| 99 | 1047.6396 | 38.7307 | 0.511 | 0.164 |
| 100 | 1048.1218 | 38.9769 | 0.590 | 0.205 |
| 101 | 1048.6039 | 39.2612 | 0.688 | 0.194 |
| 102 | 1049.0861 | 39.5931 | 0.782 | 0.144 |
| 103 | 1049.5681 | 39.9699 | 0.851 | 0.103 |
| 104 | 1050.0503 | 40.3804 | 0.901 | 0.095 |
| 105 | 1050.5323 | 40.8146 | 0.947 | 0.126 |
| 106 | 1051.0145 | 41.2711 | 1.008 | 0.153 |
| 107 | 1051.4966 | 41.7569 | 1.082 | 0.135 |
| 108 | 1051.9788 | 42.2784 | 1.146 | 0.048 |
| 109 | 1052.4608 | 42.8310 | 1.170 | -0.081 |
| 204 | 1098.2620 | 74.6823 | -0.370 | 0.048 |
| 205 | 1098.7440 | 74.5038 | -0.347 | 0.053 |
| 206 | 1099.2262 | 74.3363 | -0.322 | -0.030 |

Point at which positive and negative of first differential values are changed = Peak Two points on either side of half value (transmittance 42.5873) = Half value [2]

Point at which positive and negative of second differential values are changed = Base [2]

FIG.1B

| | | Wavenumber | Transmittance |
|---|---|---|---|
| 1) | Peak (point at which the positive and negative of the first differential values are changed) | 1044.2649 | 37.6966 |
| 2) | Base (point at which the positive and negative of the second differential values are changed) | | |
| | Base [1] | 1034.6226 | 53.9773 |
| | Base [2] | 1051.9788 | 42.2784 |
| 3) | Baseline (straight line connecting two bases) | Transmittance [Y] = -0.674 x wavenumber [X] + 53.9773 | |
| 4) | Peak height (difference in transmittance between the baseline at a wavenumber at the peak of 1044.2649 and the peak) | | -9.781 |
| | Half value of peak height | Transmittance | 42.5873 |
| 5) | Half width (wavenumber width of half value [1] and half value [1]) | | 13.088 |
| | Half value [1] (wavenumber when transmittance along the straight line connecting two points on either side of the half value is the half value) | 1039.1605 | |
| | Half value [2] (wavenumber of the straight line connecting two points on either side of the half value at the half value) | 1052.2482 | |
| 6) | Peak area (peak height x half width) | | -128.02 |

FIG.1C

| Examples | | 1 | 2 | 3 | 4 | 5 | 6 | 7 | 8 |
|---|---|---|---|---|---|---|---|---|---|
| First resin layer | Number of layers | 4 | 4 | 4 | 4 | 4 | 4 | 4 | 4 |
| | Material | Adhesive ETFE 1 | Adhesive ETFE 2 | Adhesive ETFE 3 | Adhesive ETFE 4 | Adhesive ETFE 5 | Adhesive ETFE 6 | Adhesive ETFE 7 | Adhesive ETFE 8 |
| | Thickness | 0.5 | 0.5 | 0.5 | 0.5 | 0.5 | 0.5 | 0.5 | 0.5 |
| | F thickness/overall thickness % | 14.3 | 14.3 | 14.3 | 14.3 | 14.3 | 14.3 | 14.3 | 14.3 |
| | Flexural modulus | 1200 | 1200 | 1200 | 770 | 770 | 770 | 500 | 500 |
| | H/F | 4.0 | 1.0 | 0.2 | 4.0 | 1.0 | 0.2 | 4.0 | 1.0 |
| Second resin layer | Material | ZL1105 | ZL1105 | ZL1105 | ZL1105 | ZL1105 | ZL1105 | ZL1105 | ZL1105 |
| | Thickness | 0.2 | 0.2 | 0.2 | 0.2 | 0.2 | 0.2 | 0.2 | 0.2 |
| Third resin layer | Material | P-880 | P-880 | P-880 | P-880 | P-880 | P-880 | P-880 | P-880 |
| | Thickness | 1.3 | 1.3 | 1.3 | 1.3 | 1.3 | 1.3 | 1.3 | 1.3 |
| Reinforcement layer | Material | Polyester fiber | Polyester fiber | Polyester fiber | Polyester fiber | Polyester fiber | Polyester fiber | Polyester fiber | Polyester fiber |
| Outermost layer | Material | P-880 | P-880 | P-880 | P-880 | P-880 | P-880 | P-880 | P-880 |
| | Thickness | 1.5 | 1.5 | 1.5 | 1.5 | 1.5 | 1.5 | 1.5 | 1.5 |
| Chemical resistance | Judgement | oo+ | oo+ | oo+ | oo+ | oo+ | oo+ | oo+ | |
| Softness | Judgement | o | Δ | o | o | o | o | o | |
| Overall evaluation | Judgement | 3 | 3 | 2 | 3 | 3 | 3 | 3 | 3 |

FIG.2A

| Examples | | 9 | 10 | 11 | 12 | 13 | 14 | 15 | 16 |
|---|---|---|---|---|---|---|---|---|---|
| First resin layer | Number of layers | 4 | 4 | 4 | 4 | 4 | 4 | 4 | 4 |
| | Material | Adhesive ETFE 9 | Adhesive ETFE 1 | Adhesive ETFE 1 | Adhesive ETFE 1 | Adhesive ETFE 2 | Adhesive ETFE 3 | Adhesive ETFE 4 | Adhesive ETFE 5 |
| | Thickness | 0.5 | 0.2 | 0.2 | 0.2 | 0.2 | 0.2 | 0.2 | 0.2 |
| | F thickness/overall thickness % | 14.3 | 5.7 | 5.7 | 5.7 | 5.7 | 5.7 | 5.7 | 5.7 |
| | Flexural modulus | 500 | 1200 | 1200 | 1200 | 1200 | 1200 | 770 | 770 |
| | H/F | 0.2 | 4.0 | 4.0 | 4.0 | 1.0 | 0.2 | 4.0 | 1.0 |
| Second resin layer | Material | ZL1105 | ZL1105 | ZL1105 | ZL1105 | ZL1105 | ZL1105 | ZL1105 | ZL1105 |
| | Thickness | 0.2 | 0.6 | 0.4 | 0.2 | 0.2 | 0.2 | 0.2 | 0.2 |
| Third resin layer | Material | P-880 | P-880 | P-880 | P-880 | P-880 | P-880 | P-880 | P-880 |
| | Thickness | 1.3 | 1.2 | 1.4 | 1.6 | 1.6 | 1.6 | 1.6 | 1.6 |
| Reinforcement layer | Material | Polyester fiber | Polyester fiber | Polyester fiber | Polyester fiber | Polyester fiber | Polyester fiber | Polyester fiber | Polyester fiber |
| Outermost layer | Material | P-880 | P-880 | P-880 | P-880 | P-880 | P-880 | P-880 | P-880 |
| | Thickness | 1.5 | 1.5 | 1.5 | 1.5 | 1.5 | 1.5 | 1.5 | 1.5 |
| Chemical resistance | Judgement | ∞+ | ∞+ | ∞+ | ∞+ | ∞+ | ∞+ | ∞+ | ∞+ |
| Softness | Judgement | ∞− | ∞− | ∞+ | ∞+ | ∞+ | ∞+ | ∞+ | ∞+ |
| Overall evaluation | Judgement | 3 | 4 | 5 | 5 | 5 | 5 | 5 | 5 |

FIG.2B

| Examples | | 17 | 18 | 19 | 20 | 21 | 22 | 23 | 24 |
|---|---|---|---|---|---|---|---|---|---|
| First resin layer | Number of layers | 4 | 4 | 4 | 4 | 4 | 4 | 4 | 4 |
| | Material | Adhesive ETFE 6 | Adhesive ETFE 7 | Adhesive ETFE 8 | Adhesive ETFE 9 | Adhesive ETFE 9 | Adhesive ETFE 9 | Adhesive ETFE 1 | Adhesive ETFE 2 |
| | Thickness | 0.2 | 0.2 | 0.2 | 0.2 | 0.2 | 0.2 | 0.05 | 0.05 |
| | F thickness/ overall thickness % | 5.7 | 5.7 | 5.7 | 5.7 | 5.7 | 5.7 | 1.4 | 1.4 |
| | Flexural modulus | 770 | 500 | 500 | 500 | 500 | 500 | 1200 | 1200 |
| | H/F | 0.2 | 4.0 | 1.0 | 0.2 | 0.2 | 0.2 | 4.0 | 1.0 |
| Second resin layer | Material | ZL1105 | ZL1105 | ZL1105 | ZL1105 | ZL1105 | ZL1105 | ZL1105 | ZL1105 |
| | Thickness | 0.2 | 0.2 | 0.2 | 0.2 | 0.05 | 0.03 | 0.2 | 0.2 |
| Third resin layer | Material | P-880 | P-880 | P-880 | P-880 | P-880 | P-880 | P-880 | P-880 |
| | Thickness | 1.6 | 1.6 | 1.6 | 1.6 | 1.75 | 1.77 | 1.75 | 1.75 |
| Reinforcement layer | Material | Polyester fiber | Polyester fiber | Polyester fiber | Polyester fiber | Polyester fiber | Polyester fiber | Polyester fiber | Polyester fiber |
| Outermost layer | Material | P-880 | P-880 | P-880 | P-880 | P-880 | P-880 | P-880 | P-880 |
| | Thickness | 1.5 | 1.5 | 1.5 | 1.5 | 1.5 | 1.5 | 1.5 | 1.5 |
| Chemical resistance | Judgement | oo+ | oo+ | oo+ | oo+ | oo- | o | o | o |
| Softness | Judgement | oo+ | oo+ | oo+ | oo+ | oo+ | oo+ | oo+ | oo+ |
| Overall evaluation | Judgement | 5 | 5 | 5 | 5 | 5 | 4 | 3 | 3 |

FIG.2C

| Examples | | 25 | 26 | 27 | 28 | 29 | 30 | 31 |
|---|---|---|---|---|---|---|---|---|
| First resin layer | Number of layers | 4 | 4 | 4 | 4 | 4 | 4 | 4 |
| | Material | Adhesive ETFE 3 | Adhesive ETFE 4 | Adhesive ETFE 5 | Adhesive ETFE 6 | Adhesive ETFE 7 | Adhesive ETFE 8 | Adhesive ETFE 9 |
| | Thickness | 0.05 | 0.05 | 0.05 | 0.05 | 0.05 | 0.05 | 0.05 |
| | F thickness/overall thickness % | 1.4 | 1.4 | 1.4 | 1.4 | 1.4 | 1.4 | 1.4 |
| | Flexural modulus | 1200 | 770 | 770 | 770 | 500 | 500 | 500 |
| | H/F | 0.2 | 4.0 | 1.0 | 0.2 | 4.0 | 1.0 | 0.2 |
| Second resin layer | Material | ZL1105 | ZL1105 | ZL1105 | ZL1105 | ZL1105 | ZL1105 | ZL1105 |
| | Thickness | 0.2 | 0.2 | 0.2 | 0.2 | 0.2 | 0.2 | 0.2 |
| Third resin layer | Material | P-880 | P-880 | P-880 | P-880 | P-880 | P-880 | P-880 |
| | Thickness | 1.75 | 1.75 | 1.75 | 1.75 | 1.75 | 1.75 | 1.75 |
| Reinforcement layer | Material | Polyester fiber | Polyester fiber | Polyester fiber | Polyester fiber | Polyester fiber | Polyester fiber | Polyester fiber |
| Outermost layer | Material | P-880 | P-880 | P-880 | P-880 | P-880 | P-880 | P-880 |
| | Thickness | 1.5 | 1.5 | 1.5 | 1.5 | 1.5 | 1.5 | 1.5 |
| Chemical resistance | Judgement | ○ | ○ | ○ | △ | ○ | ○ | ○ |
| Softness | Judgement | ○○+ | ○○+ | ○○+ | ○○+ | ○○+ | ○○+ | ○○+ |
| Overall evaluation | Judgement | 3 | 3 | 3 | 3 | 2 | 3 | 3 |

FIG.2D

| Comparative Examples | | 1 | 2 | 3 | 4 | 5 |
|---|---|---|---|---|---|---|
| First resin layer | Number of layers | 1 | 4 | 4 | 4 | 4 |
| | Material | Adhesive ETFE 5 | 1180A | Adhesive ETFE 5 | Adhesive ETFE 5 | Adhesive ETFE 5 |
| | Thickness | 0.2 | 0.2 | 0.03 | 0.8 | 0.2 |
| | F thickness/overall thickness % | 1 | 14.3 | 0.8 | 22.9 | 20 |
| | Flexural modulus | 770 | 10 | 770 | 770 | 770 |
| | H/F | 1.0 | infinity | 1.0 | 1.0 | 1.0 |
| Second resin layer | Material | | ZL1105 | ZL1105 | ZL1105 | ZL1105 |
| | Thickness | | 0.2 | 0.2 | 0.2 | 0.1 |
| Third resin layer | Material | | P-880 | P-880 | P-880 | P-880 |
| | Thickness | | 1.6 | 1.77 | 1 | 0.3 |
| Reinforcement layer | Material | | Polyester fiber | Polyester fiber | Polyester fiber | Polyester fiber |
| Outermost layer | Material | | P-880 | P-880 | P-880 | P-880 |
| | Thickness | | 1.5 | 1.5 | 1.5 | 0.4 |
| Chemical resistance | Judgement | cannot be evaluated. | x | oo | oo | |
| Softness | Judgement | x | oo | x | x | |
| Overall evaluation | Judgement | 1 | 1 | 1 | 1 | 1 |

FIG.2E

FLEXIBLE TUBE

RELATED APPLICATIONS

This application is a bypass continuation of PCT International Application No. PCT/JP2022/039985 filed on Oct. 26, 2022, which claims priority to Japanese Patent Application No. 2022-170286 filed Oct. 25, 2022, the entire contents of both of which are incorporated herein by reference for all purposes.

BACKGROUND

Technical Field

The present disclosure relates to a soft flexible tube, which has excellent resistance to acid and alkali fluids such as an aqueous sodium hypochlorite solution and an aqueous caustic soda solution used in e.g. manufacturing plants for food including beverages, cosmetics, perfume, medicines and the like.

Description of the Related Art

Fluororesins have excellent characteristics such as chemical resistance, heat resistance, weather resistance and gas barrier properties, and the amount of substance released from them is small. Flexible tubes, using a fluororesin as a material directly coming into contact with a fluid, have been used in various industrial fields. Fluororesins, however, are hard and expensive, and thus a laminated hose is proposed in which a thermoplastic resin is laminated on the outer circumferential surface to reduce the amount of fluororesin used.

Japanese Patent No. 4247103 (Patent Literature 1), for example, discloses a fuel hose in which an ethylene/tetrafluoroethylene copolymer (hereinafter, ETFE) having excellent fuel barrier properties, chemical resistance and heat resistance is used as an inner layer material and polyamide having excellent mechanical characteristics and durability is laminated as an outer layer material. Japanese Translation of PCT International Application No. 2020-535986 (Corresponding to U.S. patent application U.S. Ser. No. 10/801,649B2) (Patent Literature 2) also discloses a fuel hose which has high resistance to hydrocarbon fuel and fuel vapor by covalently binding the inner layer including PVDF and the outer layer including a thermoplastic resin.

These fuel hoses, however, have excellent fuel barrier properties and chemical resistance but the softness thereof is poor, and there has been a problem in that when a flexible tube is placed so that the radius of a circle drawn by the flexible tube (bending radius) will be small in applications required to have a high degree of freedom of tube arrangement, for example, particularly in manufacturing plants for food including beverages, cosmetics, perfume, medicines and the like, the flexible tube will be kinked to block the flow channel.

Therefore, a laminated hose is proposed, in which softer polyurethane is used as a thermoplastic resin laminated on the outer circumferential surface.

Japanese Patent No. 4696293 (Patent Literature 3) discloses a food hose having excellent softness, in which a polyamide layer and a polyurethane layer are laminated on the inner layer including ETFE.

SUMMARY

According to an aspect of the present disclosure, there is provided a flexible tube, including at least a first resin layer which includes adhesive ETFE, which is a fluororesin to which an adhesive functional group is provided, and has a thickness of 0.05 to 0.5 mm and 1 to 16% of an overall thickness of the flexible tube, and a second resin layer which is provided on an outer side of the first resin layer and includes a thermoplastic resin different from in the first resin layer, wherein in the adhesive ETFE, a flexural modulus measured by ASTM D790 is 500 to 1200 MPa and a ratio (A)/(B), which is obtained by FTIR measurement, of a peak area (A) corresponding to C—H bonds at a wavenumber of 1400 to 1500 cm$^{-1}$ and a peak area (B) corresponding to C—F bonds at a wavenumber of 1000 to 1100 cm$^{-1}$ is 0.2 to 4.0.

BRIEF DESCRIPTION OF THE DRAWINGS

FIGS. 1A to 1C are explanatory diagrams illustrating a calculation example of the peak area corresponding to C—F bonds at a wavenumber of 1000 to 1100 cm$^{-1}$ of adhesive ETFE 5; and FIGS. 2A to 2D are explanatory diagrams illustrating the details of each embodiment 1 to 31; and FIG. 2E is an explanatory diagram illustrating the details of a comparative example.

DESCRIPTION OF THE EMBODIMENT

The above-described Patent Literatures 1, 2, and 3 have the following drawback. Manufacturing plants for e.g. food, cosmetics, perfume and medicines have a step of washing the inner surface of a tube with an acid or alkali fluid such as an aqueous sodium hypochlorite solution or an aqueous caustic soda solution every time when fluids flowing in the tube are changed as a measure against foreign body contamination in products in the course of manufacture, to handle a plurality of products. Therefore, there has been a problem in that an acid or alkali component in a chemical solution used for washing permeates the surface coming into contact with the solution and corrodes the polyamide layer, and thus interlayer separation caused blocked flow channels.

Therefore, an object of the present disclosure is to provide a soft flexible tube, which has excellent resistance to acid and alkali fluids such as an aqueous sodium hypochlorite solution and an aqueous caustic soda solution used in e.g. manufacturing plants for food including beverages, cosmetics, perfume, medicines and the like.

The above-described object is achieved by (1) to (4) described below.

(1) A flexible tube, including at least a first resin layer in which the thickness of the layer including a fluororesin is 0.05 to 0.5 mm and the thickness of the layer including a fluororesin is 1 to 16% of the overall thickness of the flexible tube, and a second resin layer which is provided on an outer side of the first resin layer and includes a thermoplastic resin different from in the first resin layer, wherein in the fluororesin, the flexural modulus measured by ASTM D790 is 500 to 1200 MPa and the ratio (A)/(B), which is obtained by FTIR measurement, of the peak area (A) corresponding to C—H bonds at a wavenumber of 1400 to 1500 cm$^{-1}$ and the peak area (B) corresponding to C—F bonds at a wavenumber of 1000 to 1100 cm$^{-1}$, is 0.2 to 4.0.

(2) The flexible tube according to the above (1), characterized in that the thermoplastic resin in the second resin layer is a polyamide resin and the thickness of the second resin layer is 0.05 to 0.4 mm.

(3) The flexible tube according to the above (2), characterized in that a third resin layer including a thermoplastic resin is laminated on the outer side of the second resin layer, the ratio (E)=(D)/(C) is 0.4 or less wherein (C) is the internal diameter of the flexible tube and (D) is the overall thickness of the flexible tube, the ratio (H)=(G)/(F) is 4.0 or more wherein (F) is the thickness of the first resin layer and (G) is the thickness of the third resin layer, and the product of the ratios (E) and (H), (E)×(H), is 0.8 to 1.7.

(4) The flexible tube according to the above (3), which includes at least one reinforcement material selected from the group consisting of a fiber, a monofilament, a wire and a spring between layers next to each other.

A suitable embodiment of the flexible tube of the present disclosure will now be described in detail.

The flexible tube according to the embodiment in the present disclosure is a soft flexible tube, which has excellent resistance to acid and alkali fluids such as an aqueous sodium hypochlorite solution and an aqueous caustic soda solution used in e.g. manufacturing plants for food including beverages, cosmetics, perfume, medicines and the like, for example.

<First Resin Layer>

The first resin layer is formed from a fluororesin. In order to impart electrical conductivity, a carbon-based or metal-based electroconductive filler may be added thereto; however, it is not required to add the electroconductive filler.

The thickness of the first resin layer is preferably 0.05 to 0.5 mm and more preferably 0.1 to 0.4 mm. When the thickness is thinner than 0.05 mm, acid and alkali fluids permeates the layer and corrode the second resin layer, and thus a flexible tube including the thin layer cannot be used as a flexible tube in which acid and alkali fluids flow. Meanwhile, when the thickness is thicker than 0.5 mm, the permeation of acid and alkali fluids can be suppressed, but kinks are easily caused when bending a flexible tube including the thick layer, and thus a flexible tube cannot be obtained, which can be placed with a small bending radius. Therefore, when the thickness is within the range, the softness and permeation resistance to acid and alkali fluids of the first resin layer are improved, and thus a soft flexible tube, which is not corroded even when an acid or alkali fluid flows therein, is not kinked even when it is placed with a small bending radius and has not existed until now, can be obtained.

In addition, in a case where the thickness of the first resin layer is larger than 16% of the overall thickness of the flexible tube, when bending the flexible tube, the other layers on the outer side of the first resin layer cannot retain the cross-sectional circle shape of the first resin layer, and kinks are caused because the cross-sectional shape becomes flat. It is not preferred that the thickness of the first resin layer be smaller than 1% of the overall thickness of the flexible tube because when bending the flexible tube, inside the bend, the first resin layer follows the movements in the compression direction of the other layers on the outer side thereof, to cause wrinkles on the first resin layer and then the flexible tube is kinked starting from the wrinkles.

The first resin layer is preferably formed from a material which does not contaminate a fluid and is not influenced by e.g. corrosion due to the fluid. It is specifically, it is a fluororesin, and examples thereof include, but not limited to, an ethylene/tetrafluoroethylene copolymer (ETFE), polyvinylfluoride (PVF), polyvinylidenefluoride (PVDF), an ethylene/chlorotrifluoroethylene copolymer (ECTFE), a tetrafluoroethylene/hexafluoropropylene/vinylidenefluoride terpolymer (THV) and the like. The fluororesin is preferably ETFE having high mechanical strength and melt formability, and more preferably adhesive ETFE to which an acid-modified adhesive functional group is provided.

The fluororesin has a flexural modulus of 500 to 1200 MPa measured by ASTM D790. The flexural modulus depends on the number average molecular weight of fluororesin, and can be a criterion for the number average molecular weight. That is, a higher flexural modulus indicates a higher number average molecular weight, and a lower flexural modulus indicates a lower number average molecular weight. Therefore, when the flexural modulus is less than 500 MPa, the number average molecular weight is low leading to less molecular chain entanglement, and thus the free volume between molecular chains becomes larger, which acid and alkali fluids easily permeate into. When the flexural modulus is larger than 1200 MPa, the number average molecular weight is high, melt formability is reduced, and a soft flexible tube cannot be obtained. The flexural modulus is preferably 600 to 1100 MPa.

In the fluororesin, the ratio (A)/(B) of the peak area (A) corresponding to C—H bonds at a wavenumber of 1400 to 1500 $cm^{-1}$ and the peak area (B) corresponding to C—F bonds at a wavenumber of 1000 to 1100 $cm^{-1}$ obtained by FTIR measurement is 0.2 to 4.0. The peak area ratio corresponds to the ratio of the C—H unit and C—F unit in the fluororesin, that is, a higher peak area ratio indicates more C—H units, and a lower peak area ratio indicates more C—F units. Therefore, when the peak area ratio is less than 0.2, more C—F units are obtained, the fluororesin is high in mechanical strength, melt formability is reduced, and a soft flexible tube cannot be obtained. Meanwhile, when the peak area ratio is larger than 4.0, more C—H units are obtained, C—C bonds binding H atoms are easily rotated because the atomic diameter of the H atom is smaller than of the F atom, the free volume becomes larger, which acid and alkali fluids easily permeate into.

<Second Resin Layer>

The second resin layer is provided on an outer side of the first resin layer and is formed from a thermoplastic resin different from that in the first resin layer, and additives may be added thereto to display functions such as softness, heat stability, light stability and weather resistance. The additives are e.g. a plasticizer to impart softness and a stabilizer, and examples of the plasticizer include, but not limited to, a hydroxybenzoic acid alkyl ester-based plasticizer with a molecular weight of 200 to 400, and the like.

For the second resin layer, a material with softness and excellent adhesive properties to fluororesins is preferably used. Examples of the thermoplastic resin include, but not limited to, polyamide, polyvinyl chloride, a polyamide-based elastomer, a polyurethane-based elastomer, a polystyrene-based elastomer, an olefin-based elastomer, mutually mixed materials thereof, modified resins obtained by treating them in conventionally known methods, and the like. Preferred thermoplastic resins are Polyamide 11, Polyamide 12, a polyamide-based elastomer and mutually mixed materials thereof, which have a flexural modulus of 200 to 1300 MPa measured by ISO 178.

The thickness of the second resin layer is preferably 0.05 to 0.4 mm and more preferably 0.1 to 0.35 mm.

When the thickness is thinner than 0.05 mm, the mechanical strength of the flexible tube is reduced. Meanwhile, when the thickness is thicker than 0.4 mm, a soft flexible tube cannot be obtained. Therefore, when the thickness is within the range, the second resin layer can obtain softness.

<Third Resin Layer>

The third resin layer is formed from a thermoplastic resin, and additives may be added thereto to display functions such as softness, heat stability, light stability and weather resistance. Examples of the additives include, but not limited to, a plasticizer to impart softness, a stabilizer and the like.

For the third resin layer, a material with excellent softness is preferably used. Examples of the thermoplastic resin include, but not limited to, polyamide, polyvinyl chloride, a polyamide-based elastomer, a polyurethane-based elastomer, a polystyrene-based elastomer, an olefin-based elastomer, mutually mixed materials thereof, and the like. Preferred thermoplastic resins are polyurethane-based elastomers with low mechanical strength and excellent softness, and more preferred thermoplastic resins are ester-based, capro-based, carbonate-based and ether-based polyurethane elastomers with a shore A hardness of 60 to 95 and a rebound resilience of 40 to 70% measured by JIS K 7311.

The thickness of the third resin layer is preferably 0.1 to 5.0 mm and more preferably 0.5 to 3.5 mm to impart appropriate softness to the flexible tube.

<Reinforcement Material>

Examples of the reinforcement material include multiple braids or a single braid including e.g. polyester, PET, nylon (registered trademark) or aramid fiber, an olefin resin, a monofilament including e.g. a polyester resin, a multifilament obtained by weaving thin monofilaments, a flat yarn (or tape yarn) including a tape-shaped yarn, a metal wire including e.g. stainless, or a coil including a hard material classified into stainless, and the like.

<Laminate Structure>

The flexible tube of the present disclosure is a flexible tube having a laminate structure in which the first resin layer including a fluororesin and the second resin layer including a thermoplastic resin in the present disclosure are laminated.

In the flexible tube of the present disclosure, the first resin layer has chemical resistance and the amount of substance released therefrom is small, and the second resin layer has softness and adhesive properties to the first resin layer, and therefore a flexible tube can be produced, which has excellent chemical resistance and an extremely small amount of substance released therefrom and is not easily broken compared to a single layer tube including a fluororesin. Furthermore, by laminating a soft third resin layer, a soft flexible tube can be obtained, which is not kinked even when it is placed with a small bending radius and has not existed until now.

As long as the basic laminate structure is included, a flexible tube obtained by further laminating a layer including another thermoplastic resin on the basic structure may be produced, and a reinforcement material may be included between any layers next to each other. The number of layers in the whole flexible tube is not particularly restricted, and is at least three or more layers, normally 3 to 8 layers and preferably 3 to 5 layers.

The overall thickness of the flexible tube is determined considering the internal diameter of the flexible tube and various characteristics such as softness and pressure resistance depending on applications. From the viewpoint of pressure resistance, kink resistance and handling, it is preferred that as the internal diameter of the flexible tube increases, the thickness increase. Specifically, the ratio (E)=(D)/(C) is preferably 0.4 or less wherein (C) is the internal diameter of the flexible tube and (D) is the overall thickness of the flexible tube. When (E) is larger than 0.4, the thickness is thick compared to the internal diameter of the flexible tube, the softness of the flexible tube is lost, and the flexible tube is not suitable for use in e.g. various manufacturing plants which are required to have the degree of freedom of tube arrangement. It is also preferred that the ratio (H)=(G)/(F) is 4.0 or more wherein (F) is the thickness of the first resin layer and (G) is the thickness of the third resin layer. When (H) is less than 4.0, the thickness of the third resin layer is not enough to impart softness to the flexible tube, and a soft flexible tube cannot be obtained.

Furthermore, from (E) and (H), the thickness of the first resin layer and the thickness of the third resin layer can be provided compared to the overall thickness of the flexible tube which varies depending on the internal diameter, and (E)×(H) preferably meets a range from 0.8 to 1.7. When (E)×(H) is less than 0.8, the overall thickness of the flexible tube is thin compared to the internal diameter of the flexible tube, and therefore the cross-sectional circle shape cannot be retained when bending the flexible tube, and kinks are caused because the cross-sectional shape becomes flat. When it is larger than 1.7, the overall thickness of the flexible tube is thick compared to the internal diameter of the flexible tube, and therefore wrinkles are caused because when bending the flexible tube, the inside of the bend is compressed, and the flexible tube is kinked starting with the wrinkles.

As the internal diameter of the flexible tube increases, the bending radius (R) increases. In the flexible tube of the present disclosure, a value (R)/(C) obtained by dividing the bending radius (R) by the internal diameter (C) is less than 15. It is preferred that (R)/C be less than 15 because kinks are not caused even when the flexible tube is placed with a small bending radius. The value is preferably less than 13 and further preferably less than 11.

<Laminating Method>

As the method for forming the flexible tube of the present disclosure, there are (1) a method for forming a flexible tube having a two layer structure at one time by coextrusion, in which an adhesive fluororesin forming the first resin layer and a thermoplastic resin forming the second resin layer are coextruded in a molten state to attach the two layers, and (2) a method in which the outer surface of a tube obtained by extruding a fluororesin forming the first resin layer is modified by a discharge treatment such as a plasma discharge or corona discharge or a drug solution treatment such sodium as etching, various adhesive functional groups are introduced to the surface and then a thermoplastic resin forming the second resin layer is extruded and laminated on the fluororesin tube, the outer surface of which has been treated, and the like.

From the viewpoint of productivity, a method by coextrusion is preferred, and in order to improve adhesiveness between layers, a fluororesin having adhesive properties can be used for the first resin layer.

Examples of the acid-modified fluororesin having adhesive properties include "Fluon (registered trademark) LM-ETFE AH Series (manufactured by AGC Inc.)" and "Neoflon (registered trademark) EFEP RP series (manufactured by DAIKIN INDUSTRIES, LTD.)" and the like as ETFE to which an adhesive functional group is introduced.

In a case where an acid-modified adhesive fluororesin is used for the first resin layer, using polyamide which has good compatibility with the acid-modified adhesive fluororesin for the second resin layer, and a polyurethane elastomer which has good compatibility with polyamide and excellent heat resistance for the third resin layer, a soft flexible tube with excellent chemical resistance and heat resistance can be obtained by simultaneously laminating three layers by coextrusion.

The flexible tube of the present disclosure has excellent chemical resistance and softness. In addition, because of e.g. excellent heat resistance, corrosion resistance, oil resistance and weather resistance, it can be suitably used as tubes and hoses for food, cosmetics, perfume, medicines, medical care, fuels, coolants, pure water, inks and the like.

Example 1

The present disclosure will now be described in detail by giving Examples. However, the technical scope of the present disclosure is not limited thereto.

It should be noted that peak area ratios, chemical resistance and softness, measurement items, were measured by methods described below.

<Peak Area Ratio>

For FTIR measurement, Fourier Transform Infrared Spectrophotometer manufactured by JASCO Corporation "FT/IR-6100 type A (wavenumber interval 0.482117 $cm^{-1}$)" was used, and a pelletized resin was used as a sample to measure the peak area ratio. First, a first differential value obtained by dividing a transmittance increment by a wavenumber increment, and a second differential value obtained by dividing a first differential value increment by a wavenumber increment were each calculated, points at which the positive and negative of the first differential values are changed were considered the extremes, and points at which the positive and negative of the second differential values are changed were considered the inflection points. The point of the smallest transmittance value among the extremes as the peak, the inflection points on either side thereof as the base [1] and the base [2] were used, and a difference between the transmittance along the straight line connecting the base [1] and the base [2] at the wavenumber of the peak and the transmittance of the peak was used as the peak height. Next, the median of the transmittance along the straight line connecting the base [1] and base [2] at the wavenumber of the peak and the transmittance of the peak was considered a half value, and the width of waveform at the half value (half width) was obtained.

From the peak corresponding to C—H bonds appearing at a wavenumber of 1400 to 1500 $cm^{-1}$, the peak height and half width were obtained, and the product thereof was used as the peak area (A) corresponding to C—H bonds. From the peak corresponding to C—F bonds appearing at a wavenumber of 1000 to 1100 $cm^{-1}$, the peak height and half width were obtained, and the product thereof was used as the peak area (B) corresponding to C—F bonds. The ratio (A)/(B) thereof is considered the peak area ratio. A calculation example of the peak area corresponding to C—F bonds at a wavenumber of 1000 to 1100 $cm^{-1}$ of adhesive ETFE 5 is shown in FIGS. 1A to 1C.

<Chemical Resistance>

The chemical resistance was measured as the time until separation was caused when a 35% aqueous solution of hydrochloric acid was put into flexible tubes in Examples 1 to 31 and Comparative Examples 1 to 5 (12 flexible tubes with 30 cm obtained from the same production lot in each of Examples and Comparative Examples) and the flexible tubes were allowed to stand under a 23° C. environment. Each flexible tube was cut at 10 cm and 20 cm from the edge and then an external force was applied until the inner surfaces come into contact with each other to become flat. It was then observed whether or not interlayer separation was caused when the flexible tube was restored in the circumferential direction with the restoring force of the flexible tube itself. Separation was observed on each flexible tube every week, and evaluations were made using oo when the time until separation was two months or more, o for 1.5 months or more and less than 2 months, Δ for one month or more and less than 1.5 months, and x for less than one month.

<Softness>

The softness was evaluated by bending flexible tubes in Examples 1 to 31 and Comparative Examples 1 to 5. A flexible tube was bent under a 23° C. environment so that a circle with a ratio of diameters in two orthogonal directions of 1:1 was obtained, and when the outer diameter of the flexible tube became flat to 90% of the normal diameter, the radius R of the circle drawn by the flexible tube (bending radius) was measured. In general, as the internal diameter of a flexible tube increases, the bending radius R increases. Therefore, evaluations were made by the ratio of the internal diameter (C) and the bending radius (R) of the flexible tube, using oo when (R)/(C) was less than 11, o for 11 or more and less than 13, Δ for 13 or more and less than 15, and x for 15 or more.

<Overall Evaluation>

First, among the flexible tubes evaluated as oo (two months or more) for its chemical resistance, those with two months or more and less than 2.5 months and those with 2.5 months or more were evaluated as "oo−" and "oo+" respectively. Among the flexible tubes evaluated as oo (less than 11) for its softness, those with 9 or more and less than 11 and those with less than 9 were evaluated as "OO−" and "OO+" respectively.

Furthermore, overall evaluations were made at 5 levels based on the evaluations oo+ to x in the chemical resistance and softness using one point when one x is included, two points when one Δ is included, 3 points when one o is included, 4 points when one oo− is included, and 5 points when both the evaluations are oo+.

In order to make flexible tubes shown in Examples, adhesive ETFEs 1 to 9 having characteristics described below were prepared. The flexural modulus and peak area ratio were manipulated by changing the molar ratio of ethylene and tetrafluoroethylene at the time of polymerization, and the adhesive properties were obtained by simultaneously adding itaconic acid anhydride in an amount corresponding to 0.4 mol % with respect to the total number of moles of ethylene and tetrafluoroethylene added at the time of polymerization.

Adhesive ETFE 1 has a flexural modulus of 1200 MPa and a peak area ratio of 4.0, adhesive ETFE 2 has a flexural modulus of 1200 MPa and a peak area ratio of 1.0, adhesive ETFE 3 has a flexural modulus of 1200 MPa and a peak area ratio of 0.2, adhesive ETFE 4 has a flexural modulus of 770 MPa and a peak area ratio of 4.0, adhesive ETFE 5 has a flexural modulus of 770 MPa and a peak area ratio of 1.0, adhesive ETFE 6 has a flexural modulus of 770 MPa and a peak area ratio of 0.2, adhesive ETFE 7 has a flexural modulus of 500 MPa and a peak area ratio of 4.0, adhesive ETFE 8 has a flexural modulus of 500 MPa and a peak area ratio of 1.0, and adhesive ETFE 9 has a flexural modulus of 500 MPa and a peak area ratio of 0.2.

In Example 1, a first resin layer including adhesive ETFE 1, a second resin layer including Polyamide 12 (ZL1105 manufactured by Polyplastics-Evonik Corporation) with a flexural modulus of 300 MPa to which a hydroxybenzoic acid alkyl ester-based plasticizer with a molecular weight of 250 to 350 was added as a plasticizer, and a third resin layer including a carbonate-based polyurethane elastomer (P-880 manufactured by Dainichiseika Color & Chemicals Mfg. Co., Ltd.) with a shore A hardness of 83 and a rebound resilience of 45% as shown in FIGS. 2A to 2E were melted and integrally formed by coextrusion so that the thickness of the first resin layer was 0.5 mm, the thickness of the second resin layer was 0.2 mm and the thickness of the third resin layer was 1.3 mm. Subsequently, polyester fiber was wound thereon using a braiding machine, and on the outer side thereof, the outermost layer with a thickness of 1.5 mm including a carbonate-based polyurethane elastomer (P-880 manufactured by Dainichiseika Color & Chemicals Mfg. Co., Ltd.) was extruded and laminated to obtain a flexible tube with an internal diameter of 19 mm and an outer diameter of 26 mm.

Flexible tubes in Examples 2 to 31 and Comparative Examples 3 to 5 were obtained in the same manner as in Example 1 by properly manipulating the material and thickness of each layer so that the values shown in FIGS. 2A to 2E was obtained.

In Comparative Example 1, adhesive ETFE 5 was extruded so that the thickness was 0.2 mm as shown in FIGS. 2A to 2E to obtain a single layer tube with an internal diameter of 9 mm and an outer diameter of 9.4 mm.

In Comparative Example 2, a first resin layer including a polyurethane elastomer (1180A manufactured by BASF), a second resin layer including Polyamide 12 (ZL1105 manufactured by Polyplastics-Evonik Corporation) with a flexural modulus of 300 MPa to which a hydroxybenzoic acid alkyl ester-based plasticizer with a molecular weight of 250 to 350 was added as a plasticizer, and a third resin layer including a carbonate-based polyurethane elastomer (P-880 manufactured by Dainichiseika Color & Chemicals Mfg. Co., Ltd.) with a shore A hardness of 83 and a rebound resilience of 45% as shown in FIGS. 2A to 2E were melted and integrally formed by coextrusion so that the thickness of the first resin layer was 0.2 mm, the thickness of the second resin layer was 0.2 mm and the thickness of the third resin layer was 1.6 mm. Subsequently, polyester fiber was wound thereon using a braiding machine, and on the outer side thereof, the outermost layer including a carbonate-based polyurethane elastomer (P-880 manufactured by Dainichiseika Color & Chemicals Mfg. Co., Ltd.) was extruded and laminated so that the overall thickness of the flexible tube was 3.5 mm to obtain a flexible tube with an internal diameter of 19 mm and an outer diameter of 26 mm.

In Comparative Example 5, a first resin layer including adhesive ETFE 5, a second resin layer including Polyamide 12 (ZL1105 manufactured by Polyplastics-Evonik Corporation) with a flexural modulus of 300 MPa to which a hydroxybenzoic acid alkyl ester-based plasticizer with a molecular weight of 250 to 350 was added as a plasticizer, and a third resin layer including a carbonate-based polyurethane elastomer (P-880 manufactured by Dainichiseika Color & Chemicals Mfg. Co., Ltd.) with a shore A hardness of 83 and a rebound resilience of 45% as shown in FIGS. 2A to 2E were melted and integrally formed by coextrusion so that the thickness of the first resin layer was 0.2 mm, the thickness of the second resin layer was 0.1 mm and the thickness of the third resin layer was 0.3 mm. Subsequently, polyester fiber was wound thereon using a braiding machine, and on the outer side thereof, the outermost layer including a carbonate-based polyurethane elastomer (P-880 manufactured by Dainichiseika Color & Chemicals Mfg. Co., Ltd.) was extruded and laminated so that the overall thickness of the flexible tube was 2.0 mm to obtain a flexible tube with an internal diameter of 19 mm and an outer diameter of 23 mm.

Measurement was performed in accordance with the test methods and the obtained results were as follows.

In Examples 1 to 31, the thickness of the first resin layer was within a range from 0.05 to 0.5 mm and the thickness of the first resin layer was 1 to 16% of the overall thickness of a flexible tube. Therefore, the overall evaluation was 2 points or higher (<Chemical resistance> was Δ or better (one month or more and less than 1.5 months) and <Softness> was Δ or better (13 or more and less than 15)). Examples 1 to 31 have enough chemical resistance and softness to be used in e.g. manufacturing plants for food including beverages, cosmetics, perfume, medicines and the like.

Among these, in Examples 1 to 2, Examples 4 to 28 and Examples 30 to 31, the overall evaluation was 3 points or higher (<Chemical resistance> was o or better (1.5 months or more and less than two months) and <Softness> was o or better (11 or more and less than 13)), and thus chemical resistance and softness are excellent. In Examples 10 to 22, particularly, the overall evaluation was 4 or higher (<Chemical resistance> was oo (2 months or more) and <Softness> was oo (less than 11)), and thus chemical resistance and softness are more excellent.

In Examples 11 to 21, the thickness of the second resin layer was within a range from 0.05 to 0.4 mm, and thus the overall evaluation was 5 points (both <Chemical resistance> and <Softness> were oo+). Among Examples 1 to 31, Examples 11 to 21 have the most excellent chemical resistance and softness.

In Comparative Examples 1 to 5, the overall evaluation was one point (either <Chemical resistance> or <Softness> was x), and thus either <Chemical resistance> or <Softness> had a bad evaluation result.

In Comparative Example 1, separation was not caused because it has a single layer structure, and the evaluation of <Chemical resistance> could not be made. In addition, because it did not have the outer layer to retain the cross-sectional circle shape when bending the flexible tube, <Softness> was x (15 or more), which was a bad evaluation result. Separation due to acid and alkali fluids, for example, was not caused; however, softness was significantly low. Comparative Example 1 does not have enough softness to be used in e.g. manufacturing plants for food including beverages, cosmetics, perfume, medicines and the like.

In Comparative Example 2, <Softness> was oo (less than 11), and softness was excellent; however, the resin itself in the first resin layer was affected by an acid or alkali fluid, and thus <Chemical resistance> was x (less than one month), and chemical resistance was significantly low. Comparative Example 2 does not have enough chemical resistance to be used in e.g. manufacturing plants for food including beverages, cosmetics, perfume, medicines and the like.

In Comparative Example 3, the thickness of the first resin layer was thin, 0.03 mm, and thus <Softness> was oo (less than 11), and softness was excellent; however, acid and alkali fluids permeated in large amounts, and <Chemical resistance> was x (less than one month), which was a bad evaluation result. Comparative Example 3 does not have enough chemical resistance to be used in e.g. manufacturing plants for food including beverages, cosmetics, perfume, medicines and the like.

In Comparative Example 4, the thickness of the first resin layer was thick, 0.8 mm, and thus permeation by acid and alkali fluids was suppressed, and <Chemical resistance> was oo (two months or more), and chemical resistance was excellent; however, <Softness> was x (15 or more), which was a bad evaluation result, and softness was significantly low. Comparative Example 4 does not have enough softness to be used in e.g. manufacturing plants for food including beverages, cosmetics, perfume, medicines and the like.

In Comparative Example 5, the thickness of the first resin layer was within a range from 0.05 to 0.5 mm, and thus <Chemical resistance> was oo (two months or more), and chemical resistance was excellent; however, because the thickness of the first resin layer was thick, which was 20% of the overall thickness of the flexible tube, other layers on the outer side of the first resin layer could not retain the cross-sectional circle shape of the first resin layer, which became flat. <Softness> was x (15 or more), which was a bad evaluation result, and softness was significantly low. Comparative Example 5 does not have enough softness to be used in e.g. manufacturing plants for food including beverages, cosmetics, perfume, medicines and the like.

From the results, in a flexible tube, which at least includes a first resin layer which includes a fluororesin and has a thickness of 0.05 to 0.5 mm and 1 to 16% of the overall thickness of the flexible tube, and a second resin layer including a thermoplastic resin different from in the first resin layer, when the flexural modulus measured by ASTM D790 is 500 to 1200 MPa and the ratio (A)/(B), which is obtained by FTIR measurement, of the peak area (A) corresponding to C—H bonds and the peak area (B) corresponding to C—F bonds is 0.2 to 4.0 in the fluororesin, the flexible tube has excellent chemical resistance and softness, and has enough chemical resistance and softness to be used in e.g. manufacturing plants for food including beverages, cosmetics, perfume, medicines and the like

What is claimed is:

1. A flexible tube, comprising at least a first resin layer which comprises an adhesive ETFE thermoplastic resin, which is a fluororesin to which an adhesive functional group is provided, and has a thickness of 0.05 to 0.5 mm and 1 to 16% of an overall thickness of the flexible tube; a second resin layer which is provided on an outer side of the first resin layer and comprises a thermoplastic resin different from the thermoplastic resin in the first resin layer; and a third resin layer which is provided on an outer side of the second resin layer and comprising a thermoplastic resin, wherein a rebound resilience of the thermoplastic resin in the third resin layer is 40 to 70%, and the adhesive ETFE has a free volume between molecular chains that results in a flexural modulus of 500 to 1200 MPa, the flexural modulus being dependent on a number average molecular weight of the fluororesin, and the flexural modulus is measured by ASTM D790 is 500 to 1200 MPa and a ratio (A)/(B), which is obtained by FTIR measurement, of a peak area (A) corresponding to C—H bonds at a wavenumber of 1400 to 1500 cm-1 and a peak area (B) corresponding to C—F bonds at a wavenumber of 1000 to 1100 cm-1 is 0.2 to 4.0.

2. The flexible tube according to claim 1, wherein the thermoplastic resin in the second resin layer is a polyamide resin and a thickness of the second resin layer is 0.05 to 0.4 mm.

3. The flexible tube according to claim 2, wherein the third resin layer is laminated on the outer side of the second resin layer so that a ratio (E)=(D)/(C) is 0.4 or less wherein (C) is the internal diameter of the flexible tube and (D) is the overall thickness of the flexible tube, a ratio (H)=(G)/(F) is 4.0 or more wherein (F) is the thickness of the first resin layer and (G) is the thickness of the third resin layer, and the product of the ratios (E) and (H), (E)×(H), is 0.8 to 1.7.

4. The flexible tube according to claim 3, further comprising at least one reinforcement material selected from a group consisting of a fiber, a monofilament, a wire and a spring between layers next to each other.

* * * * *